United States Patent
Ahn et al.

(10) Patent No.: US 10,644,846 B2
(45) Date of Patent: May 5, 2020

(54) RADIO RESOURCE CONTROL

(71) Applicant: LG ELECTRONICS INC., Seoul (KR)

(72) Inventors: Joonkui Ahn, Seoul (KR); Byounghoon Kim, Seoul (KR); Hyunsoo Ko, Seoul (KR); Kijun Kim, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/084,440

(22) PCT Filed: Mar. 17, 2017

(86) PCT No.: PCT/KR2017/002894
§ 371 (c)(1),
(2) Date: Sep. 12, 2018

(87) PCT Pub. No.: WO2017/160115
PCT Pub. Date: Sep. 21, 2017

(65) Prior Publication Data
US 2019/0074940 A1    Mar. 7, 2019

Related U.S. Application Data

(60) Provisional application No. 62/335,081, filed on May 12, 2016, provisional application No. 62/335,082, (Continued)

(51) Int. Cl.
*H04L 5/00* (2006.01)
*H04J 11/00* (2006.01)
(Continued)

(52) U.S. Cl.
CPC .......... *H04L 5/0007* (2013.01); *H04J 11/005* (2013.01); *H04W 72/04* (2013.01);
(Continued)

(58) Field of Classification Search
CPC ..... H04L 5/0007; H04L 5/0053; H04L 5/005; H04L 5/0048; H04W 72/04; H04W 4/70; H04J 11/005
See application file for complete search history.

(56) References Cited

U.S. PATENT DOCUMENTS

2013/0156014 A1*  6/2013  Kim .................... H04L 5/0051
                                                                            370/336
2014/0226607 A1    8/2014  Holma et al.
(Continued)

FOREIGN PATENT DOCUMENTS

WO    WO 2011/142608 A2    11/2011
WO    WO 2013/058564 A1     4/2013
WO    WO 2015/182915 A1    12/2015

*Primary Examiner* — Walter J Divito
(74) *Attorney, Agent, or Firm* — Birch, Stewart, Kolasch & Birch, LLP (57) ABSTRACT

A device attempts to detect an on/off indicator for a plurality of transmission types in a first subframe. The device determines, as a transmission type of a second subframe, a transmission type corresponding to the detected on/off indicator out of the plurality of transmission types. The on/off indicator indicates whether the device expects that transmission according to the determined transmission type will be performed in the second subframe.

8 Claims, 12 Drawing Sheets narrow beam switching
for non MNSFN TX (a)

wide beam MBSFN TX (b)

MBSFN TX with narrow
beam at t2

(c)

Related U.S. Application Data filed on May 12, 2016, provisional application No. 62/313,148, filed on Mar. 25, 2016, provisional application No. 62/309,468, filed on Mar. 17, 2016.

(51) Int. Cl.
*H04W 72/04* (2009.01)
*H04W 4/70* (2018.01)

(52) U.S. Cl.
CPC ............ *H04L 5/005* (2013.01); *H04L 5/0048* (2013.01); *H04L 5/0053* (2013.01); *H04W 4/70* (2018.02)

(56) References Cited

U.S. PATENT DOCUMENTS

2015/0016337 A1* 1/2015 Chung .............. H04W 56/0085
370/328
2015/0351093 A1 12/2015 Au et al.

\* cited by examiner

RADIO RESOURCE CONTROL

CROSS REFERENCE TO RELATED APPLICATIONS

This application is the National Phase of PCT/KR2017/002894 filed on Mar. 17, 2017, which claims priority under 35 U.S.C. § 119(e) to U.S. Provisional Application Nos. 62/309,468; 62/313,148; 62/335,081; and 62/335,082 filed respectively on Mar. 17, 2016; Mar. 25, 2016; May 12, 2016; and May 12, 2016, all of which are hereby expressly incorporated by reference into the present application.

BACKGROUND OF THE INVENTION

Field of the Invention

The present invention relates to wireless communication, and more particularly, to a method of controlling a radio resource in a wireless communication system, and a device using the method.

Related Art

A next-generation wireless communication system is required to support various user environments and greater communication capacity. Representative issues considered in the next-generation system include massive machine type communications (MTC) for providing various services anytime anywhere by connecting a plurality of devices, ultra-reliable and low-latency communications (URLLC) considering a service sensitive to reliability and latency, or the like.

A method is proposed for optimizing power consumption of a cell and reducing interference between neighboring cells.

SUMMARY OF THE INVENTION

The present invention provides a method of controlling a radio resource in a wireless communication system, and a device using the method.

In an aspect, a method for controlling a radio resource in a wireless communication system includes attempting to detect an on/off indicator depending on a plurality of transmission types in a first subframe, determining a transmission type corresponding to the detected on/off indicator out of the plurality of transmission types as a transmission type of a second subframe, and determining whether transmission based on the determined transmission type is expected in the second subframe according to the on/off indicator.

If the on/off indicator indicates 'on', it may be expected that the transmission based on the determined transmission type is performed in the second subframe. If the on/off indicator indicates 'off', it may be expected that the transmission based on the determined transmission type is not performed in the second subframe.

In another aspect, a device in a wireless communication system includes a transceiver configured to transmit and receive a radio signal, and a processor operatively coupled to the transceiver. The processor is configured to attempt to detect an on/off indicator depending on a plurality of transmission types in a first subframe, determine a transmission type corresponding to the detected on/off indicator out of the plurality of transmission types as a transmission type of a second subframe, and determine whether transmission based on the determined transmission type is expected in the second subframe according to the on/off indicator.

A radio resource of a cell can be dynamically changed to optimize power consumption of the cell and to reduce inter-cell interference.

DESCRIPTION OF EXEMPLARY EMBODIMENTS

A wireless device may be fixed or mobile, and may be referred to as another terminology, such as a user equipment (UE), a mobile station (MS), a mobile terminal (MT), a user terminal (UT), a subscriber station (SS), a personal digital assistant (PDA), a wireless modem, a handheld device, etc. The wireless device may also be a device supporting only data communication such as a machine-type communication (MTC) device.

A base station (BS) is generally a fixed station that communicates with the wireless device, and may be referred to as another terminology, such as an evolved-NodeB (eNB), a base transceiver system (BTS), an access point, etc.

Hereinafter, it is described that the present invention is applied according to a 3rd generation partnership project (3GPP) long term evolution (LTE) based on 3GPP technical specification (TS). However, this is for exemplary purposes only, and thus the present invention is also applicable to various wireless communication networks.

Figure 1:
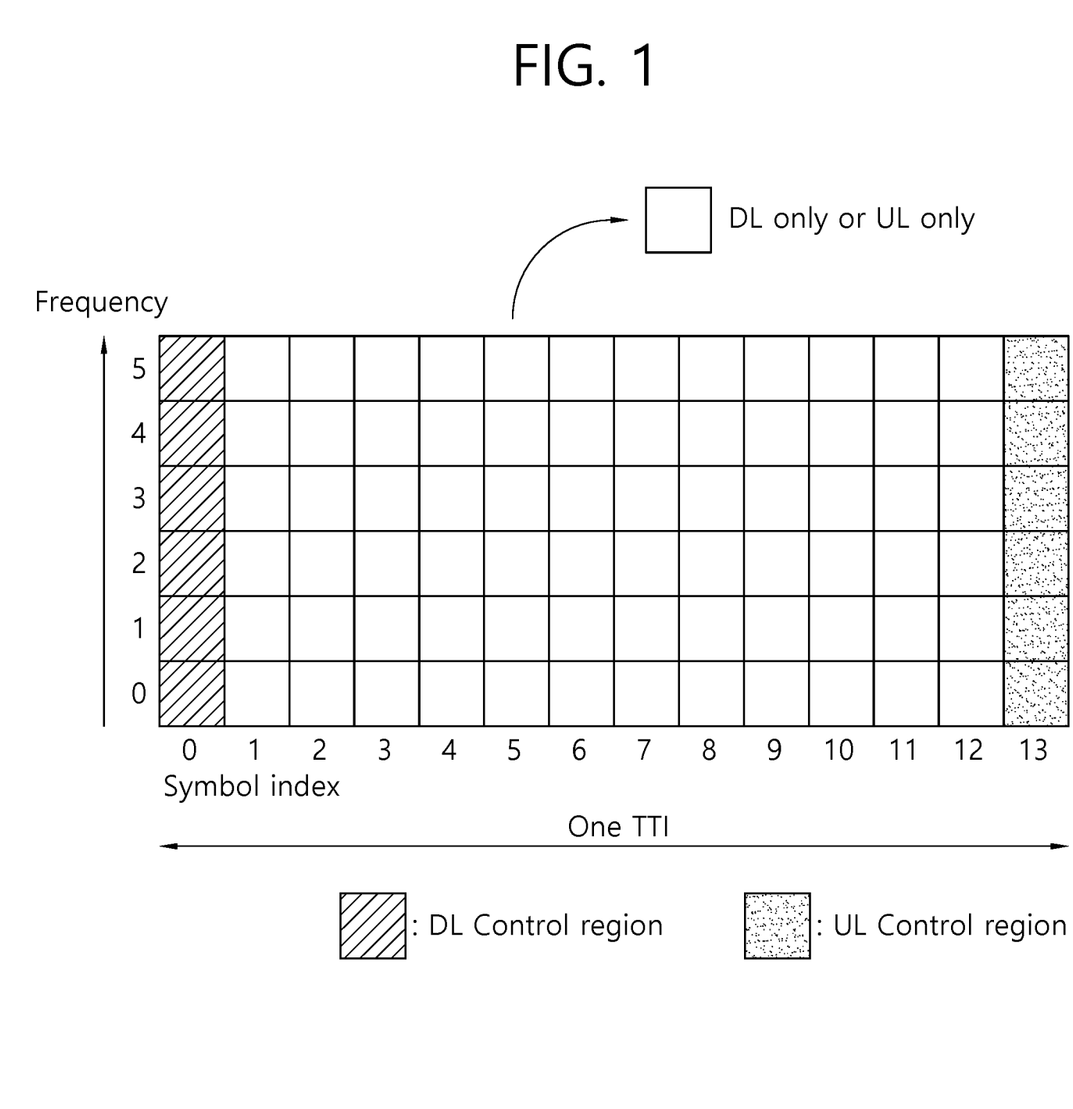
FIG. 1 shows an example of a subframe to which the present invention is applied.

FIG. 1 shows an example of a subframe to which the present invention is applied.

A subframe includes a plurality of orthogonal frequency division multiplexing (OFDM) symbols, and a time of transmitting one subframe is referred to as 1 transmission time interval (TTI). Although one subframe includes 14 OFDM symbols, this is for exemplary purposes only.

A downlink (DL) control channel may be transmitted in first one or more OFDM symbols of the subframe. This is referred to as a DL control region. An uplink (UL) control channel may be transmitted in last one or more OFDM symbols of the subframe. This is referred to as a UL control region. DL scheduling, UL scheduling, or the like may be transmitted through the DL control channel. Hybrid automatic repeat request (HARQ) ACK/NACK, channel quality indicator (CQI), or the like may be transmitted through the UL control channel.

DL data or UL data may be transmitted in OFDM symbols located in a middle portion. This is referred to as a DL/UL data region. Some or all of the OFDM symbols may be set to a guard period at a time of switching from DL transmission to UL transmission.

DL transmission and UL transmission may be sequentially performed in one subframe to decrease a time required until data is retransmitted and to minimize latency of data transmission.

A BS may periodically transmit a discovery reference signal (DRS). The DRS may be used for cell discovery, downlink synchronization, downlink measurement, or the like. A downlink (DL) signal based on the existing 3GPP LTE may be used as the DRS. At least any one of a cell specific reference signal (CRS), a primary synchronization signal (PSS), a secondary synchronization signal (SSS), and a channel state information-reference signal (CSI-RS) and/ or a combination thereof may be used.

Hereinafter, a method capable of controlling a radio resource in a cell is proposed.

A network may need to operate a 3GPP LTE system or a different system together in a frequency carrier. A specific resource may be turned on/off in the frequency carrier to enable co-existence with the different system. Alternatively, it may be necessary that resources in the same carrier are turned on/off to be shared between neighboring cells to manage inter-cell interference.

Hereinafter, 'on' implies that data transmission/reception is possible in a corresponding radio resource. 'Off' implies that an access is not allowed for a corresponding radio resource, and data transmission/reception is not expected.

Figure 2:
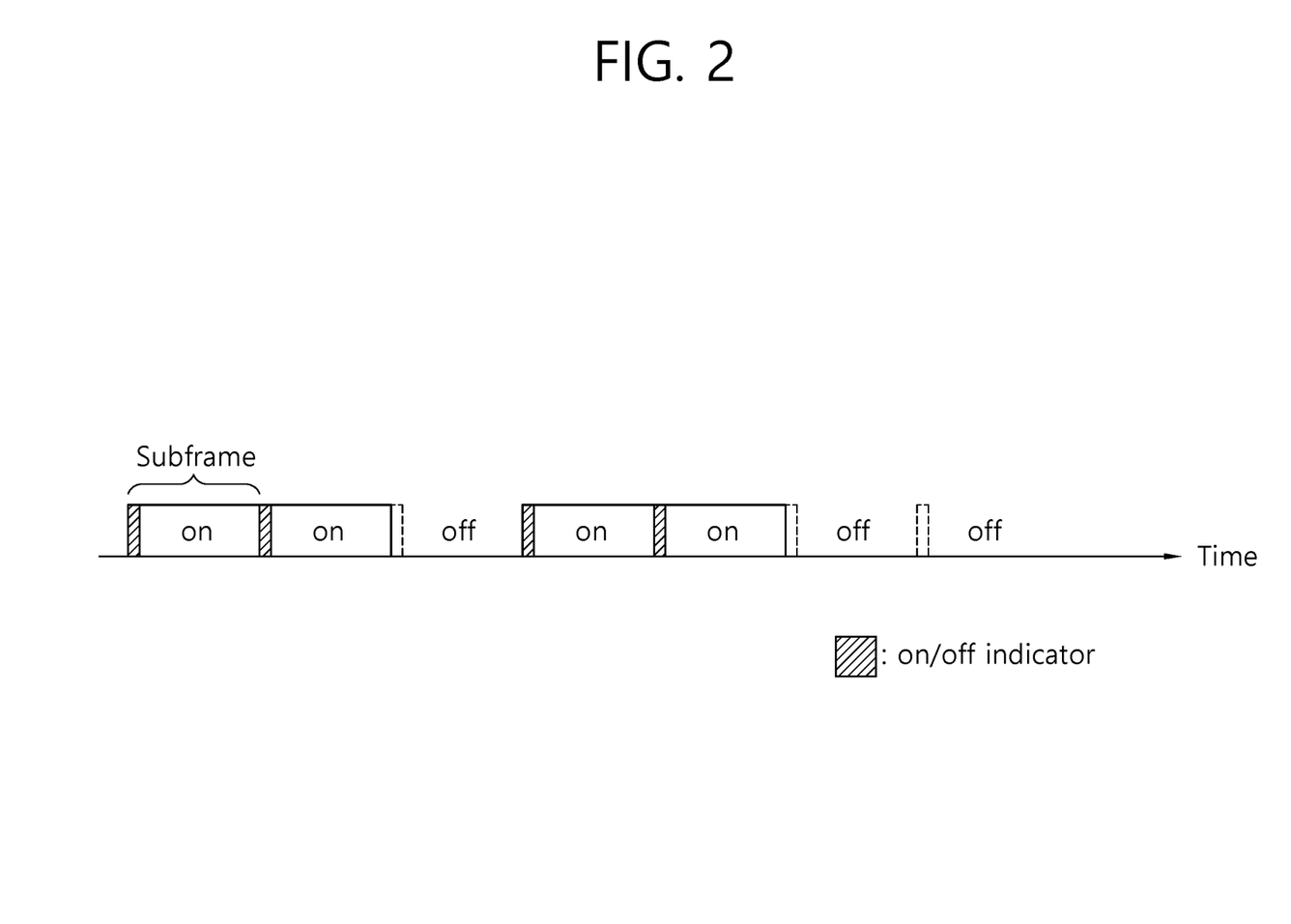
FIG. 2 shows on/off of a radio resource according to an embodiment of the present invention.

FIG. 2 shows on/off of a radio resource according to an embodiment of the present invention.

A BS (or cell) may transmit an on/off indicator capable of turning the radio resource on or off every unit time. The unit time may be one or more subframes. Hereinafter, it is assumed that the unit time is 1 subframe. A wireless device may determine whether transmission/reception is on/off in a corresponding subframe on the basis of the on/off indicator. The on/off indicator may be transmitted in a first OFDM symbol of each subframe.

Upon failing to detect a presence of the on/off indicator in the subframe, the wireless device assumes that the subframe is in an off-state. During the off-state, the wireless device may assume that all DL transmissions such as CRS transmission, CSI-RS transmission, etc., are interrupted through a corresponding cell. During the off-state, the wireless device may interrupt all UL transmissions, and may delay the UL transmission until the state changes to an on-state.

In one embodiment, the on/off indicator may be generated based on a sequence. The sequence may be a pseudo-random sequence such as an m-sequence and a gold-sequence, or a phase-shifted sequence such as a constant amplitude zero autocorrelation (CAZAC) sequence. The sequence may be a reference signal for DL channel measurement such as a CRS. A plurality of sequences that can be transmitted in one cell may be defined, and a transmission characteristic (a DL transmission length, reference signal (RS) transmission, DL/UL data transmission combination, a DL/UL control signal, etc.) in a subframe may be represented for each sequence. The wireless device may attempt to detect reception energy for a corresponding sequence in a subframe, and if the detected energy does not exceed a threshold, may regard that the sequence is not transmitted and assume that the subframe is in an off-state.

In another embodiment, the on/off indicator may be represented by an encoded bit. A well-known convolutional code, block code, etc., may be used for encoding. Upon failing to decode the received on/off indicator, the wireless device may regard that the on/off indicator is not transmitted and assume that it is in an off-state.

Figure 3:
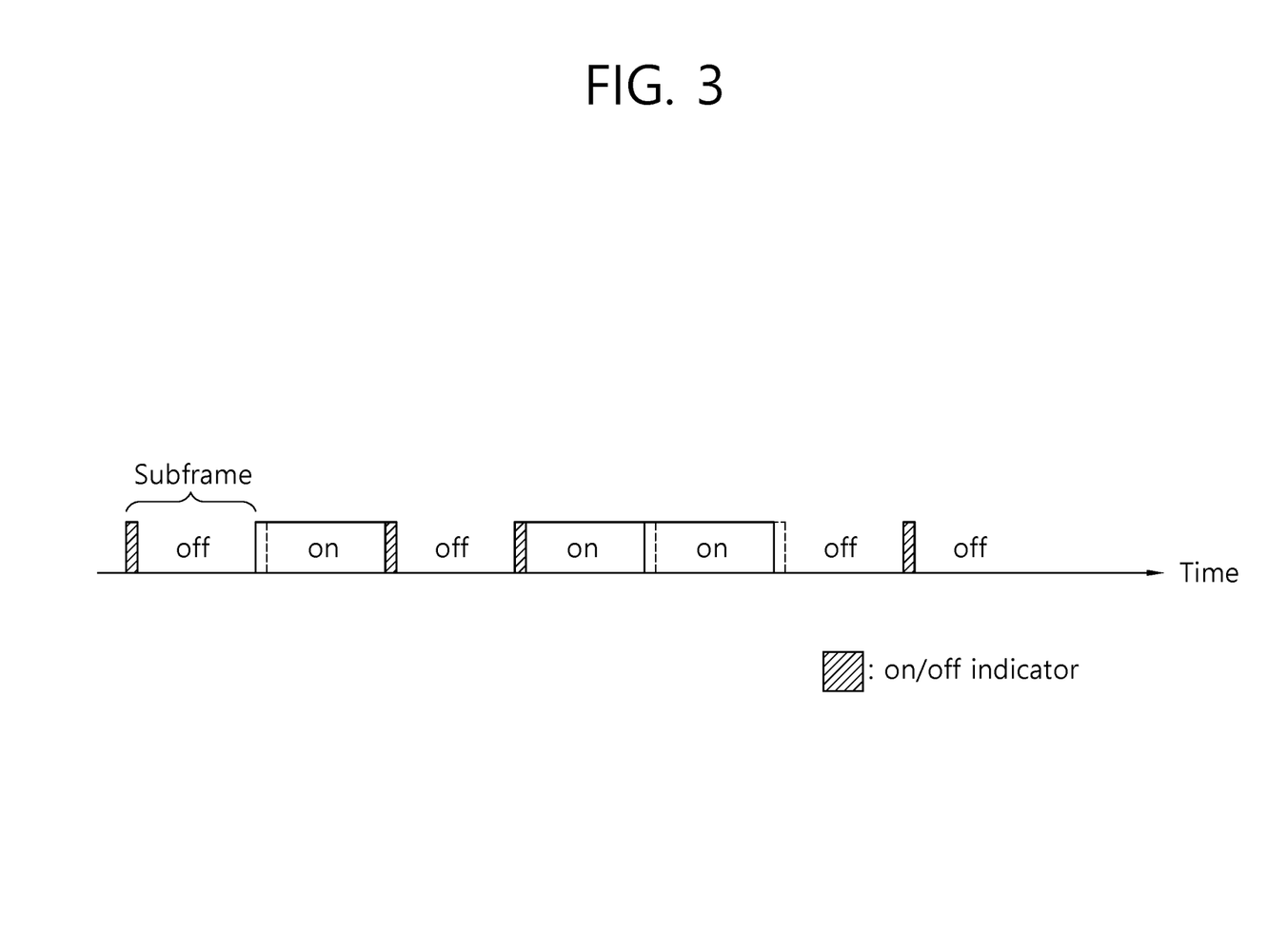
FIG. 3 shows on/off of a radio resource according to another embodiment of the present invention.

FIG. 3 shows on/off of a radio resource according to another embodiment of the present invention.

In order for a wireless device to ensure a time for a subsequent operation after detecting an on/off indicator, the on/off indicator may be transmitted before a corresponding subframe. For example, the on/off indicator received in a subframe n may indicate on/off of a subframe n+k (k>=1). The on/off indicator may indicate on/off of M (M>=1) subframes.

The on/off indicator may have timing applied differently to DL and UL. For example, the on/off indicator received in the subframe n may indicate on/off of DL transmission in a subframe n+k1 (k1>=0) and may indicate on/off of UL transmission in a subframe n+k2 (k2>=0). The on/off indicator may be applied to only one of DL and UL. The on/off indicator for DL and the on/off indicator for UL may be given independently.

Figure 4:
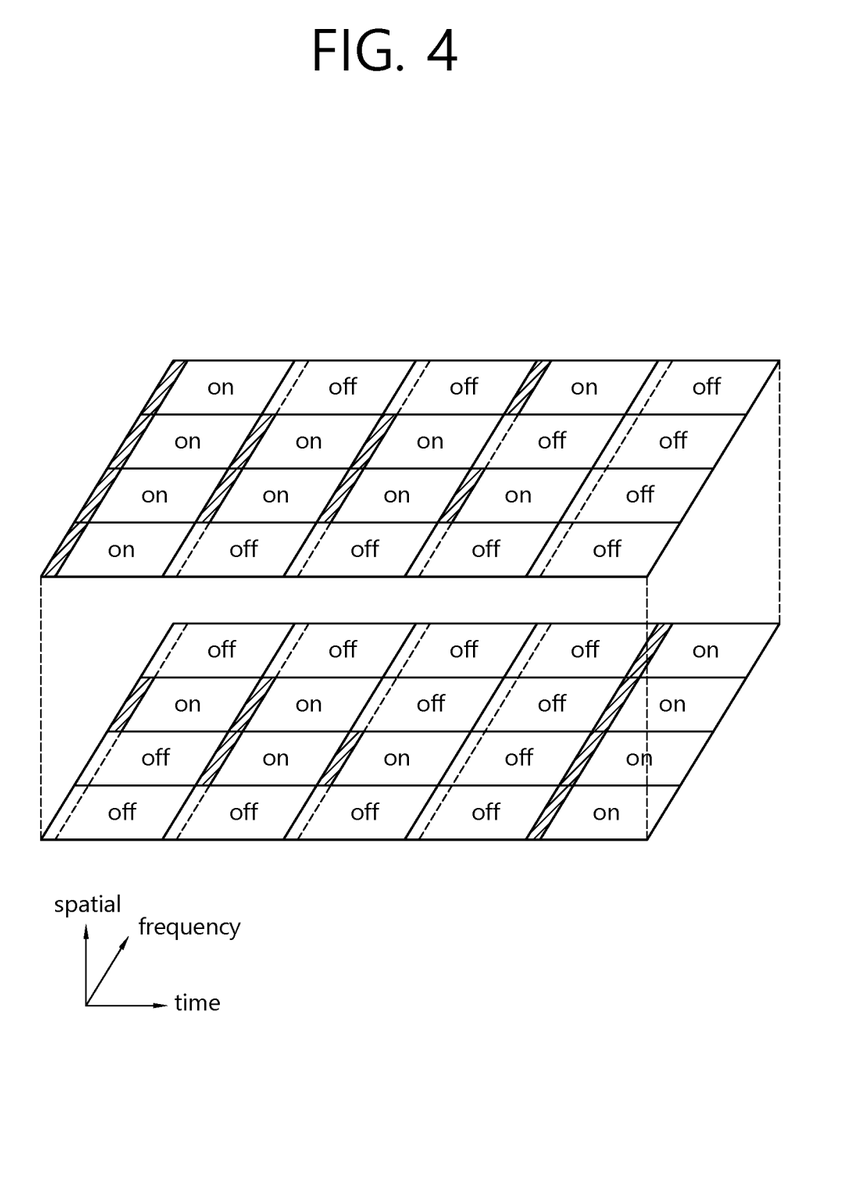
FIG. 4 shows an example of on/off for a radio resource.

FIG. 4 shows an example of on/off for a radio resource.

A wireless device may detect an on/off indicator for each unit resource. The unit resource is a unit of radio resources that can be turned on/off by the on/off indicator. The unit resource may be represented by a unit space, a unit time, a unit frequency, and a combination of them. The unit time may include one or more OFDM symbols or may include one or more subframes. The unit frequency may include one or more subcarriers or may include one or more subcarrier groups. The unit space may include one or more spatial streams or may include one or more antenna elements.

One on/off indicator may indicate on/off of one unit resource. One on/off indicator may indicate on/off of a plurality of unit resources.

On/off in a subframe may be selectively applied according to a frequency resource. The wireless device may detect the on/off indicator for each unit frequency, and if the on/off indicator is not detected, may regard that the unit frequency is off during a unit time.

On/off of a second frequency band may be indicated through an on/off indicator transmitted in a first frequency band. The wireless device may detect the on/off indicator in the first frequency band to know whether the second frequency band is on/off. Upon failing to detect the on/off indicator in the first frequency band, the wireless device may regard that the entire frequency band is off during the unit time.

When a BS supports multi-antenna transmission or beamforming transmission, an antenna resource, a beam resource, or the like is referred to as a spatial resource. On/off in a subframe may be selectively applied according to the spatial resource.

The wireless device may detect an on/off indicator for each unit space resource. If the on/off indicator is not detected, the wireless device may regard that a corresponding unit spatial resource is off during a unit time.

On/off of a second spatial resource may be indicated through an on/off indicator transmitted in a first spatial resource. The wireless device may detect the on/off indicator in the first spatial resource to know whether the second spatial resource is on/off. Upon failing to detect the on/off indicator in the first spatial resource, the wireless device may regard that the entire spatial resource is off during a unit time.

Figure 5:
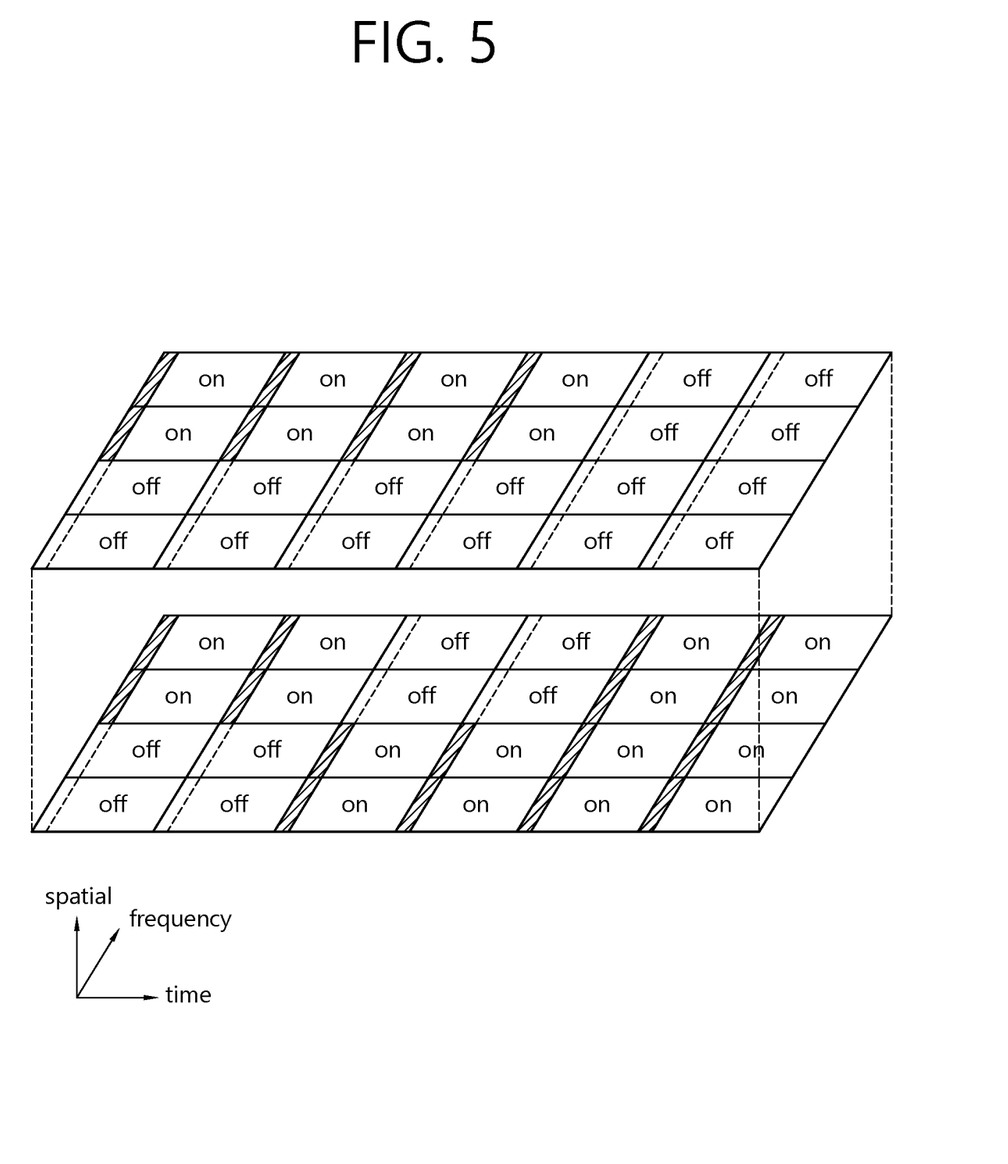
FIG. 5 shows another example of on/off for a radio resource.

FIG. 5 shows another example of on/off for a radio resource.

If it is assumed that effectiveness of each spatial resource is correlated to adjacent time/frequency resources, turning a spatial resource on/off independently for each time/frequency unit resource causes a high signaling overhead for the on/off indicator.

Time-frequency resources may be grouped, and the same spatial resource may be allocated for the grouped resources. The unit resource group may be fixed in advance or may be designated through RRC signaling. For example, a wireless device may assume that any spatial resource is turned on/off simultaneously for all frequency resources. The wireless device may assume that only one spatial resource can be turned on/off for any time resource, frequency resource, or time/frequency resource group.

In a method of being turned on/off on a unit resource basis, it is preferable that operations of DL assignment→DL data transmission→UL HARQ ACK/NACK transmission are complete in each unit resource. It is also preferable that operations of UL assignment→UL data transmission are complete in each unit resource. Therefore, the present invention proposes a unit resource for turning a resource on/off, that is, a subframe structure, as follows.

Figure 6:
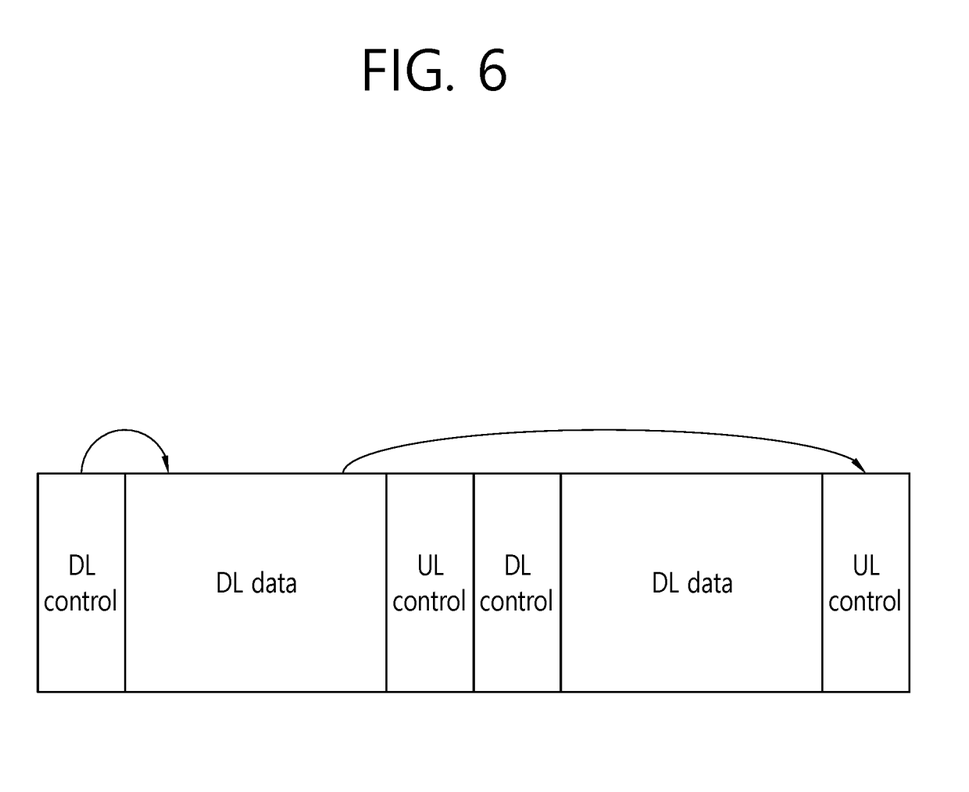
FIG. 6 shows an example of a subframe structure to which the present invention is applied.

FIG. 6 shows an example of a subframe structure to which the present invention is applied.

A subframe may include all of a DL control region, a DL data region, and a UL control region. Each region may include one or more OFDM symbols. This may correspond to the subframe structure of FIG. 1.

A plurality of subframes may be associated by considering a processing time for DL data reception and corresponding HARQ ACK/NACK transmission. An on/off indicator may indicate on/off in one or more subframes.

Upon receiving DL data in a subframe n, even if it is regarded that a subframe n+1 is off, a UE may transmit HARQ-ACK through a UL control region of the subframe n+1 or may regard that a UL data region or UL control region of the subframe n+1 is not off.

Figure 7:
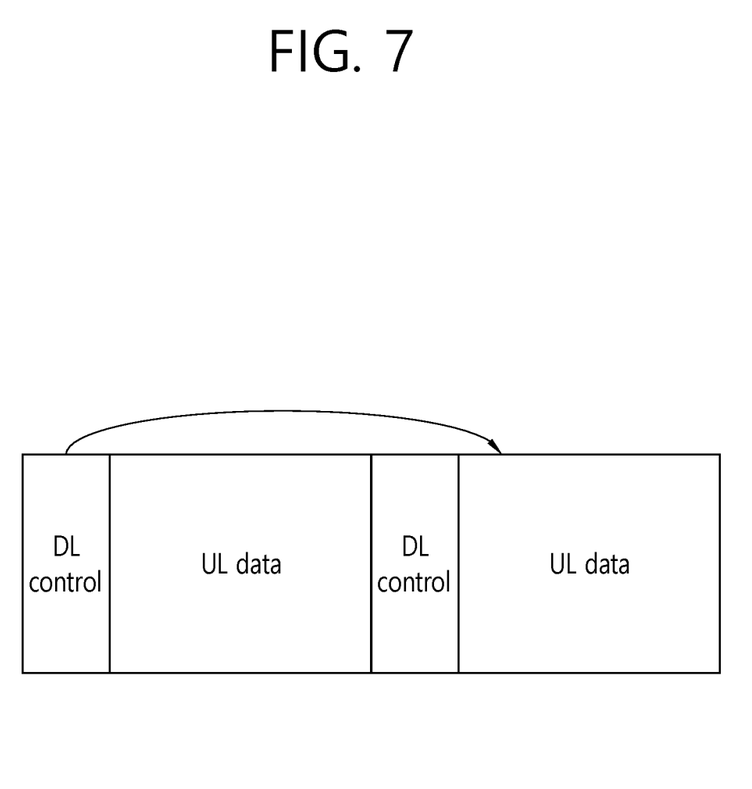
FIG. 7 shows another example of a subframe structure to which the present invention is applied.

FIG. 7 shows another example of a subframe structure to which the present invention is applied.

A subframe may include a DL control region and a UL data region. A plurality of subframes may be associated by considering a processing time for reception of UL assignment and UL data transmission for this.

Upon receiving UL assignment in a subframe n, even if it is regarded that a subframe n+1 is off, a UE may transmit UL data in a UL data region or may regard that the entire UL region or UL data region of the subframe n+1 is not off.

Figure 8:
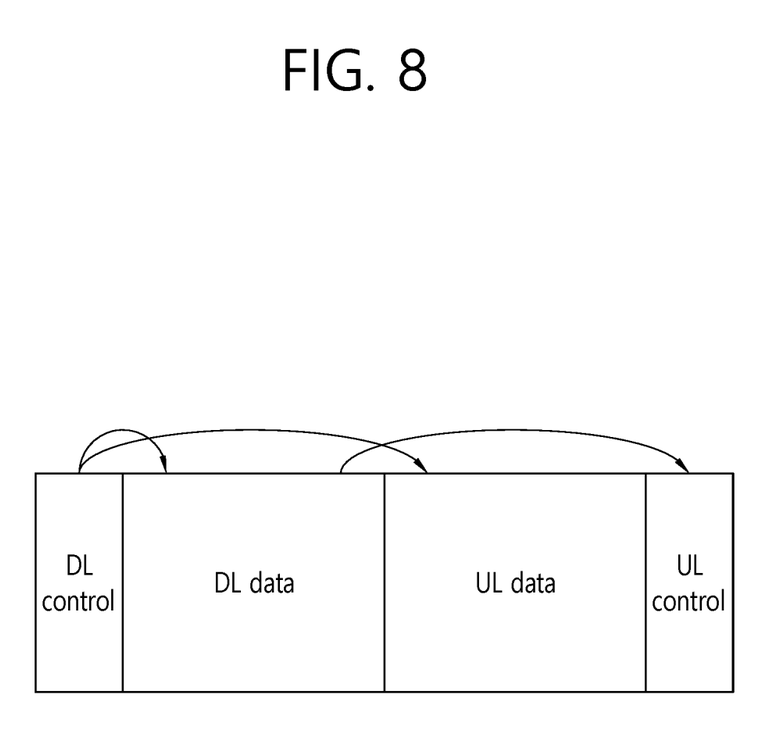
FIG. 8 shows another example of a subframe structure to which the present invention is applied.

FIG. 8 shows another example of a subframe structure to which the present invention is applied.

A subframe may include a DL control region, a DL data region, a UL data region, and a UL control region. The DL control region and the DL data region may not be adjacent to the UL data region and the UL control region.

A plurality of basic unit resources may be grouped and thus may be turned on/off for each resource group in time/frequency/spatial domains. This grouping information (a grouped frequency band, time, beam group, etc.) may be informed by a BS to the wireless device through RRC signaling or the like.

An on/off-state of each resource group may be given through an on/off indicator corresponding to a specific unit resource in each resource group. Alternatively, the on/off-state of each resource group may be given through an on/off indicator corresponding to a plurality of unit resources in each resource group. The wireless device may decode the on/off indicator corresponding to the plurality of unit resources to determine whether a corresponding resource group is on/off.

Candidate time/frequency/spatial domains in which the wireless device attempts to detect the on/off indicator may be restricted to be placed in each unit resource or unit resource group.

Meanwhile, different types of transmission may be performed on different wireless devices through different resources. The different types of transmission may be identified by each element or combinations of the elements as follows.

Cyclic prefix (CP) length
Subcarrier spacing
OFDM symbol length
Configuration of a reference signal: a scrambling sequence for a reference signal, a deployment of a resource on which the reference signal is transmitted, or the like
Unit transmission length: a subframe length or the like When it is said that a specific unit resource is turned off, it may mean that transmission is not performed based on a type by which the wireless devices attempts to perform reception by default in a corresponding unit resource. When it is said that the specific unit resource is turned on, it may mean that transmission is performed based on a type by which the wireless device attempts to perform reception by default. In this case, the UE may determine whether a unit resource is on/off by using the aforementioned methods.

The wireless device may attempt detection under the assumption that the on/off indicator is transmitted based on a transmission type by which the wireless device expects to perform reception. The wireless device may attempt detection under the assumption that a reference signal for the on/off indicator is transmitted based on a transmission type by which the wireless device expects to perform reception. The wireless device may attempt to detect an on/off indicator for a plurality of transmission types, and may determine a transmission type in a corresponding unit resource according to a transmission type to which the detected on/off indicator conforms. Alternatively, the on/off indicator may be transmitted always based on a specific transmission type through a resource different from the corresponding unit resource.

A unit resource on which the wireless device detects on/off of a specific transmission type and performs a corresponding reception operation may be configured for each UE, each UE group, or transmission type. This configuration information may be given to the wireless device through RRC signaling or the like.

The followings may be considered as an example of applying the aforementioned method.

First, a normal transmission type and a multicast-broadcast single-frequency network (MBSFN) transmission type may coexist.

A transmission type for MBSFN data has a longer CP length than a transmission type for normal data. The MBSFN transmission type may have a scrambling sequence and reference signal deployment different from those of the normal transmission type. A BS may be configured to detect an on/off indicator according to the aforementioned embodiment for dynamic switching of the normal transmission type and the MBSFN transmission type for a specific unit resource. For example, the wireless device which expects to perform reception based on the normal transmission type may detect whether transmission is performed based on the normal transmission type for a corresponding unit resource by using the on/off indicator.

Second, the normal transmission type and a low-latency communication (LLC) transmission type coexist.

A transmission type for an LLC service has a shorter unit transmission time than a transmission type for normal data to reduce a transmission latency time. For example, the normal transmission type may have a TTI of 0.2 ms, and the LLC transmission type may have a TTI of 0.05 ms. A reference signal may have a greater transmission density in a unit transmission time to satisfy demodulation performance during a short unit transmission time. A BS may be configured to detect an on/off indicator according to the aforementioned embodiment for dynamic switching of the normal transmission type and the LLC transmission type for specific unit resources. A wireless device which expects to perform reception based on the normal transmission type may use the on/off indicator to detect whether transmission is performed based on the normal transmission type for corresponding unit resources. On the contrary, a wireless device which expects to perform reception based on the LLC transmission type may use the on/off indicator to detect whether transmission is performed based on the LLC transmission type for corresponding unit resources.

Now, dynamic MBSFN transmission is described.

In MBSFN transmission, a plurality of neighboring cells transmit the same signal, and a reception signal which is a combination of radio signals is received without having to identify a cell, thereby reliably receiving multicast/broadcast data in wide coverage.

For MBSFN transmission, the same MBSFN reference signal transmission and the same coding bit transmission are necessary between neighboring cells without cell distinction unlike in non-MBSFN (or unicast) transmission. Therefore, there is a need to distinguish a subframe (an MBSFN subframe) in which MBSFN transmission is performed and a subframe (a non-MBSFN subframe) in which non-MBSFN transmission is performed. The existing 3GPP LTE system is configured in a form in which the MBSFN subframe is configured semi-statically through RRC signaling. However, when using this method, effectiveness of radio resource utilization is decreased depending on a change in amounts of MBSFN traffic and non-MBSFN traffic. Therefore, hereinafter, a method is proposed in which MBSFN transmission can dynamically operate in a cell supporting both MBSFN transmission and non-MBSFN transmission.

Figure 9:
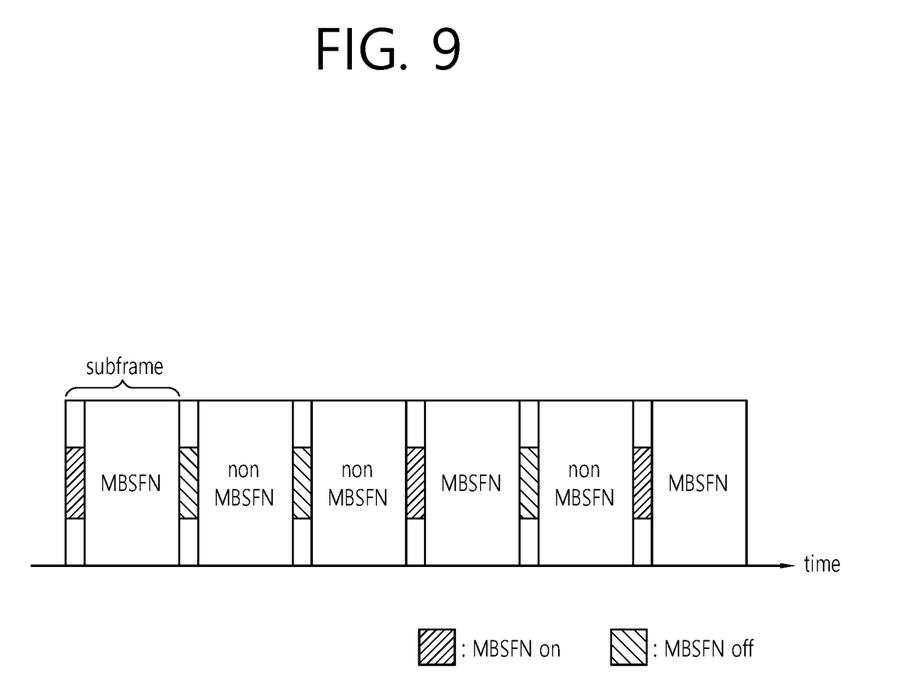
FIG. 9 shows dynamic MBSFN transmission according to an embodiment of the present invention.

FIG. 9 shows dynamic MBSFN transmission according to an embodiment of the present invention.

A BS may inform a wireless device of whether MBSFN transmission is performed every subframe. Information indicating whether a subframe is an MBSFN subframe is referred to as an MBSFN indicator. If the MBSFN indicator indicates the MBSFN subframe, it may mean that real MBSFN transmission is performed in a corresponding subframe or MBSFN transmission is assumed in the corresponding subframe. An MBSFN indicator received in a subframe n may indicate whether MBSFN transmission is performed in a subframe n+k (k>=0).

The MBSFN indicator is common information, and may be received by all wireless devices in a cell through a common channel. The MBSFN indicator may be transferred in such a manner that one of a plurality of candidate sequences is transmitted such as a CAZAC sequence, an m-sequence, or a Walsh sequence. The MBSFN indicator may include a combination of the following information.

The number of OFDM symbols in a subframe, a CP length of the OFDM symbol, whether to transmit a real NBSFN signal MBSFN service/content type Frequency and time domains to which NBSFN transmission is applied in a subframe In addition, the MBSFN indicator may be transmitted in an MBSFN format in which a plurality of cells transmit the same MBSFN indicator. In the MBSFN indicator transmitted in the MBSFN format, the following transmission elements may be designated independently of non-MBSFN transmission.

Reference signal pattern

Scrambling sequence

Transmission frequency/time domain (PDCCH search space in case of PDCCH)

Transmission mode (transmit diversity, spatial multiplexing, single antenna port transmission, etc.)

The transmission element may be fixed for the entire MBSFN transmission. Alternatively, the transmission element may be fixed for each MBSFN service/content ID. A BS may configure an ID to be applied when the wireless device determines the transmission element for the entire MBSFN transmission or for each MBSFN service/content ID through RRC signaling or the like.

Figure 10:
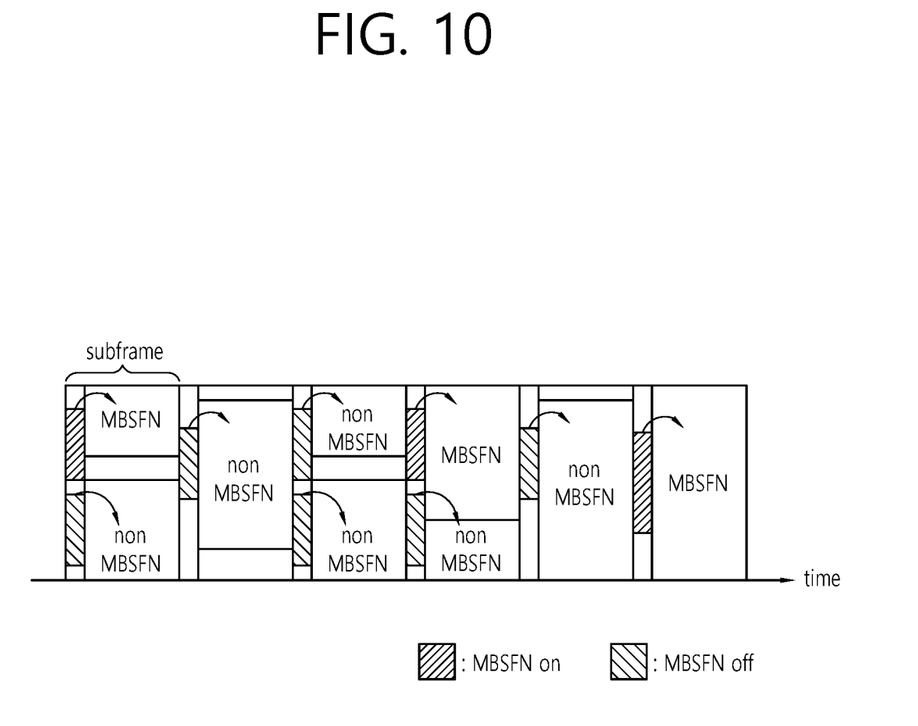
FIG. 10 shows dynamic MBSFN transmission according to another embodiment of the present invention.

FIG. 10 shows dynamic MBSFN transmission according to another embodiment of the present invention.

An MBSFN indicator may be included in downlink control information (DCI) on a PDCCH. The DCI may further include DL assignment or UL assignment.

A BS may schedule MBSFN data through the DCI having the DL assignment for scheduling DL data. The DCI may be transmitted on a common PDCCH which can be received by all wireless devices in a cell. The common PDCCH means a PDCCH which can be detected by UEs belonging to a corresponding cell through the same reference signal pattern, scrambling sequence, CRC mask, or the like in the same frequency/time domain. The DL assignment for scheduling the NBSFN data may include a frequency/time domain in which MBSFN data is transmitted, a modulation and coding scheme (MCS), precoding information, an MBSFN service/content type identifier, or the like. The DCI may include an MBSFN indicator indicating whether DL data transmission based on DL assignment conforms to MBSFN transmission or non-MBSFN transmission.

The MBSFN indicator may be indirectly transmitted in a form of a mask value for CRC added to the DCI, a search space or reference signal pattern for transmitting a corresponding PDCCH, or a scrambling sequence. The PDCCH carrying the MBSFN indicator may be transmitted in an MBSFN format.

The following operation may be assumed in the MBSFN subframe.

(1) A CRS is transmitted only in first two OFDM symbols. A wireless device may measure a channel state by using only a CRS transmitted in first two OFDM symbols of an MBSFN subframe.

(2) A CSI-RS is not transmitted. The wireless device does not measure the channel state by using the CSI-RS in the MBSFN subframe.

(3) A scheduled physical multicast channel (PMCH) is transmitted through a multicast control channel (MCCH). The wireless device may attempt to receive the PMCH under the assumption that the scheduled PMCH is transmitted in an MBSFN subframe.

It may be assumed that a subframe in which PDSCH, PUSCH, or aperiodic CSI-RS transmission is scheduled is a non-MBSFN subframe. This scheduling may be given through a PDCCH or an EPDCCH. The following operation may be assumed in the non-MBSFN subframe.

(1) If the PDSCH or aperiodic CSI-RS transmission is scheduled, the wireless device may assume that a CRS is also transmitted in an OFDM symbol other than first two OFDM symbols, a CS-RS is transmitted, and a PMCH is not transmitted in a corresponding subframe even if PMCH transmission is scheduled using an MCCH.

(2) If PUSCH or other UL transmissions are scheduled, the wireless device may assume that a CRS is not transmitted, a CSI-RS is not transmitted, and a PMCH is not transmitted in a corresponding subframe even if PMCH transmission is scheduled using an MCCH.

The MBSFN transmission may be performed in the entire subframe, or may be performed in part of a time/frequency domain of the subframe.

Upon detecting s CRS in an OFDM symbol corresponding to a non-MBSFN region of a subframe (e.g., detecting CRS receive power greater than or equal to a specific threshold), the wireless device may perform an operation assuming that the subframe is a non-MBSFN subframe.

A subframe which can be used in MBSFN transmission may be limited to some subframes out of all subframes. Information on the subframe which can be used in MBSFN transmission may be transmitted by the BS to the wireless device through RRC signaling.

A CP length of an OFDM symbol on which an MBSFN indicator is transmitted may vary depending on MBSFN transmission or non-MBSFN transmission. For example, the MBSFN transmission has a greater CP length than that of the non-MBSFN transmission. The wireless device may determine a corresponding CP length according to MBSFN transmission or non-MBSFN transmission in each subframe, and may receive the MBSFN indicator. Alternatively, the BS may inform the wireless device of the CP length of the corresponding subframe.

One MBSFN indicator may indicate whether MBSFN transmission is performed for one subframe. Alternatively, one MBSFN indicator may indicate whether MBSFN transmission is performed for a plurality of subframes. One MBSFN indicator may include 1-bit information indicating on/off only, or may include information indicating on/off information for each of a plurality of subframes.

Figure 11:
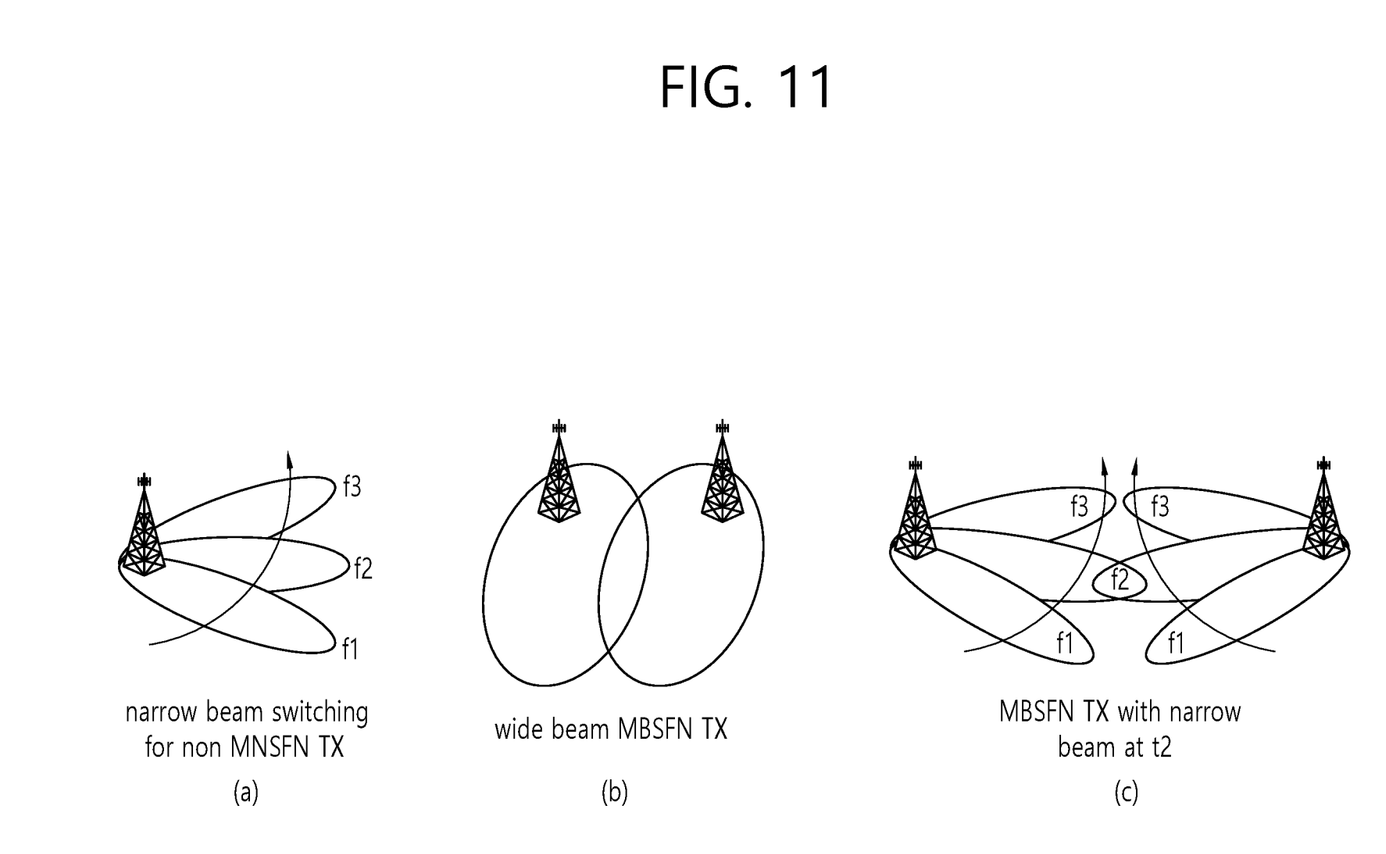
FIG. 11 shows an example of DRS transmission for MBSFN transmission.

FIG. 11 shows an example of DRS transmission for MBSFN transmission.

Transmission using a very short wavelength is considered in a next-generation communication system. In doing so, more antennas can be installed in the same area. For example, a wavelength is 1 cm in a band of 30 GHz, and 100 antenna elements can be installed in total in a form of a two-dimensional array with an interval of 0.5λ on a panel of 5 by 5 cm. A beamforming gain may be increased to increase coverage or to significantly improve throughput.

If each antenna element has a transceiver unit (TXRU) to enable transmit power and phase adjustment, independent beamforming is possible for each frequency resource. However, it is not cost effective to install the TXRU to all of about 100 antennas elements. Therefore, a method is considered in which a plurality of antenna elements are mapped to one TXRU, and a beam direction is adjusted with an analog phase shifter.

It may be possible to transmit a signal only in one narrow beam direction at one time by using a very short wavelength. Although there is an increase in coverage capable of serving the wireless device with the same transmit power within an angle in which corresponding antenna elements are directed, it is necessary to switch a beam direction over time to serve a wide angle. On the contrary, in case of using an antenna element which forms a relatively wide beam, coverage supported with the same transmit power may be small. Transmission for a wireless device located at a greater distance can be supported in such a manner that a direction of a beam with narrow directivity is switched over time. Alternatively, transmission for a wireless device located at a relatively short distance can be supported by using a beam with wide directivity.

A form of a beam for transmitting a DRS may be switched over time so that the wireless device can perform DL synchronization per transmission type for each beam. Alternatively, the form of the beam for transmitting the DRS may be switched for each OFDM symbol in a subframe.

For MBSFN reception of the wireless device, as shown in FIG. 11 (b), a plurality of cells may use a beam of wide directivity in MBSFN transmission. Alternatively, as shown in FIG. 11 (c), a plurality of cells may use coherent beams of narrow directivity in MBSFN transmission at a specific instant.

The DRS to be applied to MBSFN reception may be transmitted separately from the DRS to be applied to non-MBSFN reception, so that a UE can perform DL synchronization through the DRS at the moment of transmitting a beam of a corresponding form and utilize it in MBSFN reception. More specifically, the DRS for MBSFN reception may have DRS transmission timing, a PSS/SSS sequence constituting the DRS, a PSS/SSS frequency/time position, a CP length of an OFDM symbol for the DRS, which are different from those of the DRS non-MBSFN reception.

The wireless device may assume that wireless channel parameters (Doppler spread, delay spread, frequency offset, etc.) experienced by the DRS have the same or greater correlation with a wireless channel experienced by MBSFN data.

Figure 12:
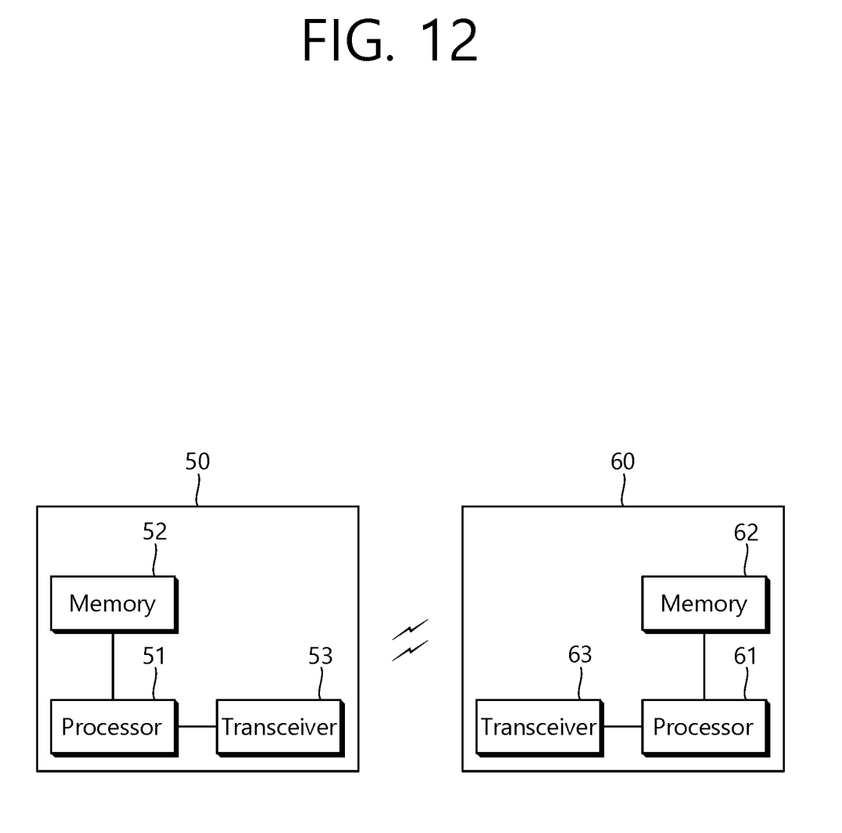
FIG. 12 is a block diagram showing a wireless communication system according to an embodiment of the present invention.

FIG. 12 is a block diagram showing a wireless communication system according to an embodiment of the present invention.

A wireless device 50 includes a processor 51, a memory 52, and a transceiver 53. The memory 52 is coupled to the processor 51, and stores various instructions executed by the processor 51. The transceiver 53 is coupled to the processor 51, and transmits and/or receives a radio signal. The processor 51 implements the proposed functions, procedures, and/or methods. In the aforementioned embodiment, an operation of the UE may be implemented by the processor 51. When the aforementioned embodiment is implemented with a software instruction, the instruction may be stored in the memory 52, and may be executed by the processor 51 to perform the aforementioned operation.

A BS 60 includes a processor 61, a memory 62, and a transceiver 63. The BS 60 may operate in an unlicensed band. The memory 62 is coupled to the processor 61, and stores various instructions executed by the processor 61. The transceiver 63 is coupled to the processor 61, and transmits and/or receives a radio signal. The processor 61 implements the proposed functions, procedures, and/or methods. In the aforementioned embodiment, an operation of the BS may be implemented by the processor 61.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for controlling a radio resource in a wireless communication system, the method performed by a wireless device and comprising:
    attempting to detect an on/off indicator indicating a switching from a first subcarrier spacing to a second subcarrier spacing;
    performing reception based on the second subcarrier spacing of the detected on/off indicator during a predefined time; and
    when no subsequent on/off indicator is detected during the predefined time, performing reception based on the first subcarrier spacing after the predefined time.

2. The method of claim 1, further comprising:
    when a subsequent on/off indicator is detected during the predefined time, performing reception based on the second subcarrier spacing during a next predefined time.

3. The method of claim 1, wherein the on/off indicator is received in one orthogonal frequency division multiplexing (OFDM) symbol.

4. The method of claim 1, wherein the predefined time includes at least one transmission time interval.

5. A device in a wireless communication system, the device comprising:
    a transceiver configured to transmit and receive a radio signal; and
    a processor operatively coupled to the transceiver and configured to:
    attempt to detect an on/off indicator indicating a switching from a first subcarrier spacing to a second subcarrier spacing;
    perform reception based on the second subcarrier spacing of the detected on/off indicator during a predefined time; and
    perform reception based on the first subcarrier spacing after the predefined time, when no subsequent on/off indicator is detected during the predefined time.

6. The device of claim 5, wherein when a subsequent on/off indicator is detected during the predefined time, the processor is configured to perform reception based on the second subcarrier spacing during a next predefined time.

7. The device of claim 5, wherein the on/off indicator is received in one orthogonal frequency division multiplexing (OFDM) symbol.

8. The device of claim 5, wherein the predefined time includes at least one transmission time interval.

* * * * *